Dec. 21, 1965  F. V. WILLIAMS ETAL  3,224,911
USE OF HYDROGEN HALIDE AS CARRIER GAS IN
FORMING III-V COMPOUND FROM A
CRUDE III-V COMPOUND

Filed Feb. 26, 1962                                    2 Sheets-Sheet 1

INVENTORS
FORREST V. WILLIAMS
ROBERT A. RUEHRWEIN

BY *William I. Andress*

ATTORNEY

INVENTORS
FORREST V. WILLIAMS
ROBERT A. RUEHRWEIN

BY *William I. Andress*

ATTORNEY

United States Patent Office 3,224,911
Patented Dec. 21, 1965

3,224,911
USE OF HYDROGEN HALIDE AS CARRIER GAS IN FORMING III–V COMPOUND FROM A CRUDE III–V COMPOUND
Forrest V. Williams, Ballwin, and Robert A. Ruehrwein, Clayton, Mo., assignors to Monsanto Company, a corporation of Delaware
Filed Feb. 26, 1962, Ser. No. 176,867
17 Claims. (Cl. 148—175)

This application is a continuation-in-part of U.S. application Serial No. 92,872 filed March 2, 1961 and now abandoned.

The present invention relates to a method for the production of epitaxial films of large single crystals of inorganic compounds. Epitaxial films which may be prepared in accordance with the invention described herein are prepared from compounds broadly defined as compounds formed from elements of Group III–B of the periodic system having atomic weights of from 24 to 119 with elements of Group V–B having atomic weights of from 12 to 133. Typical compounds within this group include the binary compounds gallium arsenide, indium arsenide, gallium phosphide and indium phosphide. As examples of ternary compounds within the defined group are the compounds $GaAs_xP_{1-x}$, $x$ having a numerical value greater than zero and less than 1, and $InAs_{0.9}P_{0.1}$. For brevity, in the description of the invention hereinafter, the compound gallium arsenide will be used for illustrative purposes with the understanding that the other defined compounds are similarly prepared and used.

It is an object of this invention to provide a new and economical method for the production of the above described class of compounds which are characterized as having a cubic crystalline structure and existing as well-defined elongated single crystals. It is a further object to provide a method for the production of single crystals of these compounds from crude forms thereof whether amorphous or crystalline.

A further object of this invention is the chemical purification of the above class of compounds by a method heretofore unknown.

A still further object of this invention is formation and deposition of epitaxial films of the above-described materials upon substrates of the same or different materials.

A further object of this invention is the production of new compositions of matter comprising epitaxial films of the above-described class of compounds deposited on seeds or substrates of same class of compounds or certain elements.

A still further object of this invention is the provision of semiconductor devices utilizing the new composition of matter as the semiconductiong component thereof.

Further objects and advantages of this invention will become apparent as the description proceeds.

In FIGS. 1–9 are shown various semiconductor devices and voltage-current graphs in accordance with the instant invention.

Figure 1:
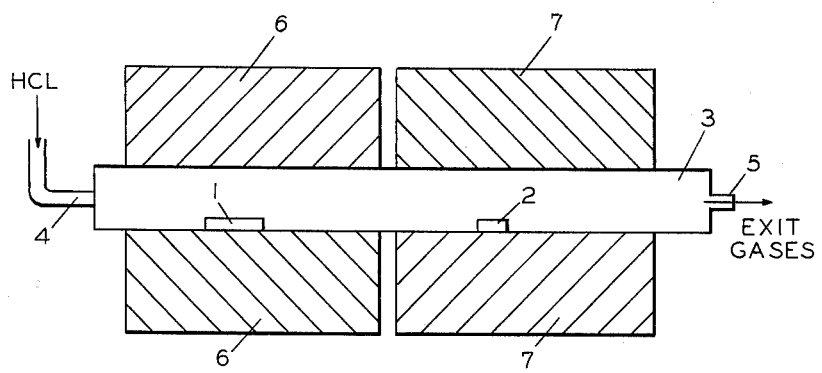
FIG. 1 is a drawing of the typical apparatus used in the vapor deposition of epitaxial films.

The present process for the production of large single crystals of the above-described compounds, typified by gallium arsenide, is based upon a chemical reaction which occurs when a crude polycrystalline form of the compound reacts with a hydrogen halide, e.g., hydrogen chloride, hydrogen bromide and hydrogen iodide, to form a complex mixture, the vapor of which is then conducted to a cooler zone wherein the original compound is reconstituted or reformed and deposits in very pure single crystal form.

The compound used as the source material may be of any desired purity. For example, in the preparation of an electronic grade gallium arsenide in which very large crystals are desired, a relatively pure form of gallium arsenide is desirably employed as the starting material. However, amorphous gallium and other crude sources are also applicable. The hydrogen halide gas may be used from a normal commercial supply such as from cylinders or by conventional preparative means.

It will be seen that the instant process includes not only a conversion of polycrystalline compounds to a single crystal form thereof suitable for epitaxial film formation, but also as a dual feature, a novel method of purification of these compounds. Various prior art methods of purification include horizontal zone refining. In this method, contamination of the compound to be purified, e.g., gallium arsenide, by the boat material, e.g., silica, is a serious obstacle to preparation of a product with carrier concentrations much less than about $5 \times 10^{16}$ and mobilities much larger than 4000–5000. Another method of purification involves refining by a floating zone technique. This method, however, still requires a prior preparation of starting compound by a horizontal gradient or zone technique in a boat (quartz or graphite). Removal of impurities by the floating zone technique is still difficult for elements with distribution coefficients greater than 0.7. Both of these methods require many hours for the purification of a single batch of material.

With respect to these purification techniques, the instant process offers the advantages of requiring only a minimum of contact with boat or crucible during the reaction and refining, and a reduction in time of the operation to a matter of minutes. In addition, the operable temperature is much lower.

Other prior art methods of purification include distillation and recrystallization which rely upon differences in vapor pressures or boiling points between the impurity and the host material. By these methods the material to be purified is placed in a suitable reactor such as a palladium, silica, or alumina tube and evaporated or sublimed along the tube by adjusting the position and the temperature of the furnace. In these methods an inert gas or hydrogen or chlorine may be used to conduct the distilled material to the cooler regions or to remove impurities.

In the present method the hydrogen halide is a critical reactant and may not be omitted, as can the inert gas, hydrogen or chlorine in the prior art methods just described. For example, if gallium arsenide is heated by itself or in the presence of an inert gas or hydrogen, there is no distillation or sublimation, but a dissociation into the component elements. Or, if gallium arsenide is heated in the presence of elemental chlorine, there is a chemical reaction which produces chlorides of gallium and arsenic, but not the desired gallium arsenide. However, when, as in the instant invention, gallium arsenide is heated in the presence of a hydrogen halide at temperatures over 700° C., a chemical reaction occurs which from equilibrium data and analyses is as follows:

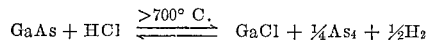

$$GaAs + HCl \underset{}{\overset{>700° C.}{\rightleftharpoons}} GaCl + \tfrac{1}{4}As_4 + \tfrac{1}{2}H_2$$

The reaction mixture is then conducted to a cooler zone where a second reaction, the reverse of that in the equation, occurs and gallium arsenide is deposited in a very pure state and in single crystal form.

The apparatus employed in carrying out the process of the present invention may be any of a number of types. The simplest type constitutes a closed tube of a refractory material such as glass, quartz or a ceramic tube such as mullite into which the crude reactant material is introduced together with the hydrogen halide vapor. The tube is then sealed off and subjected to temperatures within the range of from 135° C. to 1200° C. and, preferably, from 550° C. to 1000° C. in the high temperature zone for a period of from less than one minute to one hour or more, until the reaction is complete. After the tube has thus been heated, the reaction mixture is then passed through a region of lower temperature within the range of from 130° C. to 1195° C. and, preferably, from 545° C. to 995° C. It is essential in the preferred embodiment that a temperature differential be maintained between the respective higher and lower temperature zones, such temperature differential being from 5° C. to 1070° C., while a preferred differential is from 25° C. to 200° C.

It is to be understood that the temperature ranges recited herein are generic to the entire group of compounds disclosed, and that the specific temperatures employed in a given system will relate to and be determined by the specific compound involved. In brief, it is only necessary to heat the first temperature region to a temperature sufficiently high to enable the compound to react with the hydrogen halide vapor. As to the temperature employed in the second temperature region, it is only necessary that it be lower than the temperature in the first temperature region by an amount sufficient to permit deposition of a single crystal form of the compound from the reaction mixture. Temperature differentials between the two temperature regions will be determined by the specific compound involved, but, in general, are within the range disclosed above.

When the gaseous reaction mixture passes from the high temperature zone to the low temperature zone the above reverse reaction takes place and the single crystal form of the starting material precipitates from the vapor phase in very pure form and having good electrical resistivity, e.g., gallium arsenide prepared by this method has a resistivity of $2 \times 10^6$ ohm-cm. and a carrier concentration of about $10^{10}$ carriers/cc.

It is within the scope of this invention, although a less preferred embodiment, to employ a single temperature reaction zone wherein the crude material is first heated to reaction temperatures within the range of 135° C. to 1200° C. in the presence of the hydrogen halide, according to the above equation to obtain the complex mixture, and then reducing the reaction zone temperatures to within the lower range defined above, i.e., between 130° C. to 1195° C. to effect a reconversion of the crude starting material to a purified single crystal form of the same material. This procedure is less preferred because it does not produce as large a yield of purified product from the same quantity of crude material and in the same amount of time as the two-zone system.

The contacting and vapor phase precipitation may be carried out in a closed system which is completely sealed off after the hydrogen halide is introduced with gallium arsenide (or other compound as mentioned above), or by use of a continuous gas flow system. The pressure which is obtained in the single-vessel, closed system corresponds to the pressure exerted by the added hydrogen halide vapor at the operating temperature. When employing a continuous gas flow system, the hydrogen halide gas is advantageously introduced at the rate of from 2 cc./min. to 1000 cc./min., or preferably, from 4 cc./min. to 28 cc./min. The pressure in the system may be varied over a considerable range such as from 0.01 to 10 atmospheres, a preferred range being from 0.5 to 1.0 atmosphere.

On a larger scale, the present process is operated as a continuous flow system. This may constitute a simple tube in which the solid crude gallium arsenide is located and over which source material the hydrogen halide gas is then passed. At the higher temperatures set forth above, the gas stream passes along the same or an additional conduit to another region maintained at a lower temperature, as described above. For example, a silica tube located in a multiple-zone electric heating furnace or a two-furnace heating system may thus be employed to produce the first zone higher temperature followed by a zone of lower temperature in which the precipitation from the vapor phase takes place to yield the purified single crystal product. The product is readily removed from the walls of the reactor since it is merely precipitated from the gas phase and deposited as a mass along the walls of the tube. Various other modifications including horizontal and vertical tubes are also possible, and recycle systems in which the exit gas after precipitation of the single crystal product is returned to the system is also desirable, particularly in larger scale installations.

A particularly advantageous feature of the instant invention is the provision of a simple means of purification of the various commercially important compounds described above. As noted hereinbefore, prior art methods such as horizontal zone refining or floating zone techniques have certain disadvantages while conventional distillation and recrystallization techniques depend upon vapor pressure and boiling point differentials between impurities and host materials, and further, require carrier gasses to remove evaporated impurities but which do not combine with the host material, e.g., inert gases, nitrogen, water vapor, hydrogen, chlorine, $CO_2$, etc. By the present method, however, no reliance is placed upon these techniques. The instant purification is based upon the use of the reactant hydrogen halide which combines both with the host material and with those impurities which do combine with the hydrogen halide at the temperature present in the high temperature region of the reaction zone. When the thus formed complex mixture then enters the low temperature region of the reactor, the crude starting material is reconstituted into its original composition and deposited in single crystal form from the vapor, but less the undesired impurities originally present, which impurities, combined with the hydrogen halide are more stable at lower temperatures than the host material and so, remain in the vapor phase and are removed as exit gases.

Among the more common impurities found in the above starting materials might be mentioned silicon, magnesium, copper and iron, although these are not the only impurities encountered in actual practice. In certain embodiments of the invention it is desirable and necessary that the starting material have some impurities present and unaffected by the hydrogen halide throughout the reaction. In such cases the impurity is within certain limitations a desired constituent. This feature will be discussed hereinafter in connection with doping treatments of the materials when used in certain electronic devices.

In addition to the purification feature of this invention, another important aspect is the provision of a means of preparing and depositing epitaxial films of the purified single crystal host material onto various substrates. These deposited films permit the fabrication of new electronic devices discussed hereinafter. The characteristic feature of epitaxial film formation is that starting with a given substrate material, e.g., gallium arsenide, having a certain lattice structure, oriented in any direction, a film, layer or overgrowth of the same or different material may be vapor-deposited upon the substrate. The vapor deposit has an orderly atomic lattice and settling upon the substrate assumes as a mirror-image the same lattice structure and geometric configuration of the substrate. When using a certain material, e.g., gallium arsenide, as the substrate and another material, e.g., indium phosphide as the film deposit it is necessary that lattice distances of the deposit material closely approximate that of the substrate in order to obtain an epitaxial film.

The thickness of the epitaxial film may be controlled as desired and is dependent upon reaction conditions such as temperatures within the "hot" and "cold" zones of the reactor, temperature differentials between these zones, concentration of the hydrogen halide and time. In general, the formation of large single crystals and thicker layers is favored by small temperature gradients as defined above, and small concentrations of hydrogen halide, i.e., from about 1 mm. to 20 mm. pressure for closed systems and in open systems a flow rate of from 2 cc./min. to 20 cc./min.

Although the substrate crystal may be oriented in any direction, it has been found, unexpectedly, that epitaxial films having superior physical properties, such as smoother finish and better thickness uniformity, result when crystal growth proceeds on certain crystallographic faces. The requisite crystal faces for obtaining these superior epitaxial films are the (100) and the (111) B faces, and preferably, of these the (100) crystal face. The (111) B face is the (111) face having the Group V element exposed, e.g., in gallium arenide the (111) B face has arsenic atoms exposed, whereas the (111) A face has gallium atoms exposed.

When seed crystals having other than (100) and (111) B faces exposed are employed, e.g., the (111) A and the (110) faces, the epitaxial films deposited on them, while operable, are more likely to be rough and nonuniform in thickness, and, as a result, electronic devices made with these epitaxially deposited films have a much higher incidence of non-reproducible characteristics.

As stated hereinbefore, the epitaxial films formed in accordance with this invention comprise compounds formed from elements of Group III–B of the periodic system and particularly those having atomic weights of from 24 to 119 with elements selected from Group V–B having atomic weights of from 12 to 133. Included in this group of compounds are the nitrides, phosphides, arsenides, and antimonides of aluminum, gallium and indium. The bismuthides and thallium compounds, while operable, are less suitable. In addition to the use of the above compounds by themselves, mixtures of these compounds are also contemplated as starting materials and as epitaxial films, e.g., gallium arsenide and gallium phosphide mixed in varying proportions of any degree, when subjected to the instant process produce suitable epitaxial films of the same compositions.

Other combinations of elements within the above group which are contemplated herein include ternary compounds or mixed binary crystals such as combinations having the formulae $GaAs_xP_{1-x}$, $InAs_xP_{1-x}$, $GaP_xN_{1-x}$, $AlP_xAs_{1-x}$, etc. $x$ having a numerical value greater than zero and less than 1.

Materials useful as substrates herein include the same materials used in the epitaxial films as just described and, in addition, the elements silicon and germanium are suitable substrates.

As will be described hereinafter, the materials used herein either as films or substrates or both may be used in a purified state or containing small amounts of foreign material as "doping" agents.

The significance of structures having epitaxial films is that electronic devices utilizing "surface junctions" may readily be fabricated. Devices utilizing n-p or p-n junctions are readily fabricated by vapor depositing the host material containing the desired amount and kind of impurity hence, conductivity type upon a substrate having a different conductivity type. In this connection it was noted above that in some instances it was desirable that certain impurities be present in the host material and unaffected by the hydrogen halide. In order to obtain a vapor deposit having the desired conductivity type and resistivity, the source (host) material, e.g., gallium arsenide, utilized is of electronic grade purity. This source material is then "doped" with the desired amount and kind of a foreign material to alter the electrical properties of the gallium arsenide. Trace amounts of an element selected from Group II of the periodic system, e.g., beryllium, magnesium, zinc, cadmium and mercury are incorporated into the gallium arsenide in order to produce p-type conductivity and an element from Group VI, e.g., selenium and tellurium, to produce n-type conductivity. Those "impurities" which are not affected by the hydrogen halide are carried over with the host material in the vapor phase and deposited in a uniform dispersion in the epitaxial film of the host material on the substrate. For those impurities which have a tendency to react with the hydrogen halide, an excess amount of those impurities with respect to the hydrogen halide is added to the host material. The excess quantity added corresponds to the level of carrier concentration desired in epitaxial film to be formed.

Alternatively the impurity may be introduced into the substrate material and the single crystal form of the source material, purified or doped as desired, deposited thereon as an epitaxial film.

The doping element may be introduced in any manner known in the art, for example, by chemical combination with or physical dispersion within the source material or substrate.

Vapor deposits of the purified material having the same conductivity type as the substrate may be utilized to form intrinsic $pp^+$ or $nn^+$ regions. In this embodiment no foreign impurities are introduced into the substrate or host material.

Variations of the preceding techniques permits the formation of devices having a plurality of layers of epitaxial films each having its own electrical conductivity type and resistivity as controlled by layer thickness and dopant concentration. Since the vapor deposited host material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., gallium arsenide is vapor deposited upon the substrate of germanium. Subsequently, a quantity of the same material with different doping agents or different concentrations of the same dopant or another of the described materials, e.g., gallium phosphide may be placed into the hot region of the silica tube formerly occupied by the crude gallium arsenide. The crude gallium phosphide is then vapor deposited with a fresh quantity of hydrogen halide as a second epitaxial film over the epitaxial film of gallium arsenide already deposited on the substrate. This procedure with any desired combination of epitaxial and non-epitaxial layers can be repeated any number of times.

Alternatively, after the first layer of material is vapor deposited upon the substrate, the substrate with this epitaxial layer is removed to another reaction tube containing a second material which then is vapor deposited upon the substrate with its first epitaxial layer, thereby forming a two-layered component.

In each of these processes, the thickness of the film and the impurity concentration are controllable to obtain a variety of electrical effects required for specific purposes as discussed elsewhere herein.

Various electronic devices to which these epitaxially filmed semiconductors are applicable include diodes (e.g., tunnel diodes), parametric amplifiers, high frequency mesa transistors, solar cells, components in micromodule circuits, rectifiers, thermogenerators, radiation detectors, optical filters, watt-meters, and other semiconductor devices.

The invention will be more fully understood with reference to the following illustrative specific embodiments and accompanying figures.

EXAMPLE 1

This example illustrates the preparation of a single crystal form of purified GaP in a closed system.

Laboratory grade polycrystalline GaP (2.27 g). was placed in a fused silica tube in the dimensions of 22 mm. outside diameter and 15.3 cm. long. After evacuating to about $2 \times 10^{-6}$ mm. Hg, 33 mm. pressure of anhydrous HCl was charged to the tube and contents. The tube was then sealed off. The end of the tube containing the GaP was heated to $900 \pm 10°$ C. while the opposite end of the tube was maintained at $775 \pm 25°$ C. The tube and its contents were allowed to equilibrate at these temperatures for 24 hours, at which time the furnace was slowly cooled to room temperature. About 10% of the charged GaP had been transported to the cooler region of the tube. The transported material possessed the pale orange color characteristics of GaP. The deposited GaP consisted of well-defined clusters of single crystals with dimensions of about 1–2 mm. in all directions.

EXAMPLE 2

This example illustrates the preparation of a single crystal form of purified GaP in an open system arrangement.

A fused silica tube, 22 mm. outside diameter by 36" long, was placed in two adjacent 13" furnaces. Polycrystalline laboratory grade GaP (4.491 g.) was placed in the first of these furnaces. After flushing with argon, the furnace containing the GaP was heated to $860 \pm 10°$ C. HCl at a rate of 9 cc./min. was then introduced into the tube and allowed to pass over the GaP. After 185 minutes, the furnaces were cooled down and argon admitted to remove traces of HCl. 0.648 gram of GaP remained in the first furnace, 3.843 g. of GaP having been transported to the cooler area in the second furnace. This product was of single crystal form. The temperature of the second furnace was maintained at about $660 \pm 20°$ C.

EXAMPLE 3

This example illustrates the preparation of single crystal GaAs in an open system.

The experimental arrangement is similar to that described in Example 2, that is, a fused silica tube, open at both ends, was placed in two adjacent furnaces and 8.6725 g. of laboratory grade polycrystalline GaAs were charged to the tube. The furnace containing the GaAs was heated to 786° C. and the second furnace was heated to 580–600° C. HCl at a rate of 22 cc./min. was flowed through the GaAs for 75 minutes. 4.8864 grams of the original charge had been transported from the hot region of the first furnace. In this type of experiment, up to 50% of the GaAs which is lost from the higher temperature region is recovered in the cooler furnace.

Table I illustrates some of the variables such as HCl flow rate, times and temperatures, in a series of runs using this method.

*Table I*

| Sample, Wt. g. | Vaporization Temp. | Condensation Temp. | HCl Flow, cc./min. | Time, mins. | Sample Wt. loss, g. | g. GaAs Deposited |
|---|---|---|---|---|---|---|
| 9.3432 | 784–6 | 570–580 | 6 | 165 | 2.3282 | 0.655 |
| 9.1420 | 786–7 | 625–635 | 25 | 78 | 4.7074 | 1.386 |
| 10.7424 | 822 | 630–640 | 5.5 | 140 | 2.7963 | 1.1863 |
| 9.8284 | 826 | 610–615 | 6.2 | 300 | 7.5043 | 3.5658 |

EXAMPLE 4

This example illustrates the formation and deposition of an epitaxial film of p-type GaAs on n-type GaAs as the substrate.

The experimental arrangement is much the same as in Examples 2 and 3. FIGURE 1 is a drawing of this arrangement and will be referred to in the following description: In this experiment 8.8416 g. of polycrystalline p-type GaAs, 1, which had been doped with zinc to a level of about $1 \times 10^{20}$ carriers/cc. was placed as shown in a fused silica tube, 3, located in two adjacent furnaces, 6 and 7. The seed wafer substrate, 2, is an n-type GaAs sample which had been doped with tellurium to a level of about $5.8 \times 10^{18}$ carriers/cc., was placed in the silica tube in the region of furnace 7, which was maintained at about 625° C. Furnace 6 was heated to about 780° C. The seed wafer was polycrystalline with large areas of single crystal regions and weighed 2.9822 g. prior to the experiment. HCl at a rate of about 10 cc./min. was introduced into the silica tube at entrance 4, and flowed through the tube for about 5 hours. When the seed wafer was re-weighed it was found that 0.560 g. of GaAs had been deposited on the surfaces of the seed. X-ray diffraction patterns of the substrate wafer, in those regions which previously had been single crystal, showed that the deposit was also single crystal and oriented in the same fashion as the substrate. Point contact rectification tests showed that a p-n junction existed in the region of the junction between the epitaxial layer and the substrate.

EXAMPLE 5

This example is similar to Example 4, but illustrates the deposition of an n-type epitaxial layer of GaAs on a p-type substrate of GaAs.

The GaAs source in this experiment was 9.7272 g. of polycrystalline n-type GaAs which had been doped with tin to a level of $1–2 \times 10^{18}$ carriers/cc. The seed wafer substrate was single crystal, oriented (111) A, p-type GaAs which had been doped with zinc to a carrier level of $6–9 \times 10^{19}$ atoms/cc. Furnace 6 was heated to 600° C. and furnace 7 to 780° C. HCl was flowed through the tube at a rate of 10–30 cc./min. for 3 hours. The seed wafer was re-weighed and had accepted 0.365 g. of deposited GaAs, the original weight being 2.053 g. The side of the wafer holding the thinner deposit was epitaxial, that is, an X-ray diffraction diagram showed the same orientation as the original wafer.

EXAMPLE 6

This example illustrates the preparation of mixed single crystals of GaP and GaAs from a polycrystalline mixture of the same.

Laboratory grade GaAs and GaP, in ratios of 6 to 4 is charged to an open end tube, as described in previous examples. HCl at a flow rate of 10–20 cc./min. is passed through the tube for 3 hours. The GaAs–GaP mixture is maintained at 800° C. in the hotter region of the tube and the cooler region at 650° C. The mixture deposits in single crystal form in the cooler region and is found to transmit red light. Optical absorption measurements indicate that the forbidden energy gap is about 1.9 ev., indicating that the starting ratio of As to P of 6:4 is maintained in the deposit material.

When this example is repeated using a p-type starting material and a substrate mixture of n-type GaAs–GaP, the transported source material deposits on the substrate as an epitaxial film about 0.1 mm. thick having the same single crystal lattice orientation as the substrate. The p-type film and n-type substrate form a p-n junction and exhibits rectification.

When thinner films are desired, the reaction time may be shortened by increasing the temperature differentials between the hot and cold zones and/or increasing the flow rate of the hydrogen halide.

EXAMPLE 7

Figure 2:
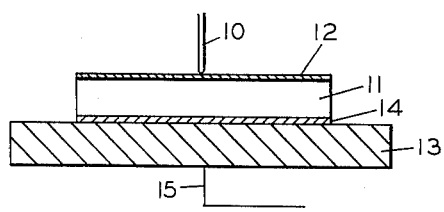
FIG. 2 is a schematic diagram of a point contact rectifier having the epitaxial layer and substrate typical of this invention.

The construction of a point contact rectifier is shown in the present example. In FIG. 2, 10 represents a point contact electrode of a conventional metal such as tungsten, molybdenum, Phosphorus bronze or platinum, which makes a retifying contact with the present device. Element 11 represents a semiconductor material such as n or p type gallium phosphide as the substrate. The epitaxial film 12, of single crystal gallium phosphide which may be of n or p type as discussed below is formed by vapor phase deposition. The gallium phosphide so prepared is a thin layer, which is readily obtained at $10^{-5}$ cm. to 0.05 or preferably $5 \times 10^{-7}$ to 0.1 cm. These can be far thinner, e.g., to $\frac{1}{10}$ as thin as can be obtained by mechanical sawing using conventional means. The semiconductor substrate 11 is in contact with a base metal 13 formed from a conventional metal such as copper or a similar material. This element 13 desirably has good thermal conductivity. In order to provide good electrical contact between the semiconductor 11 and the base metal 13, a conducting material such as a film of silver, 14 for example, may be employed as the soldering material to provide an ohmic contact of low resistance. The base metal 13 is provided with a lead 15 of copper, etc. of good electrical conductivity which represents the second contact. It can exist in a variety of forms convenient to the device user.

Figure 3:
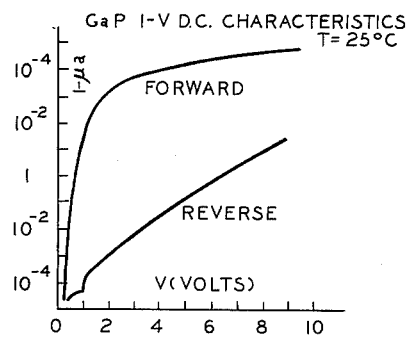
FIG. 3 is a graph of the D.C. current-voltage characteristics in the forward and reverse directions.
Figure 4:
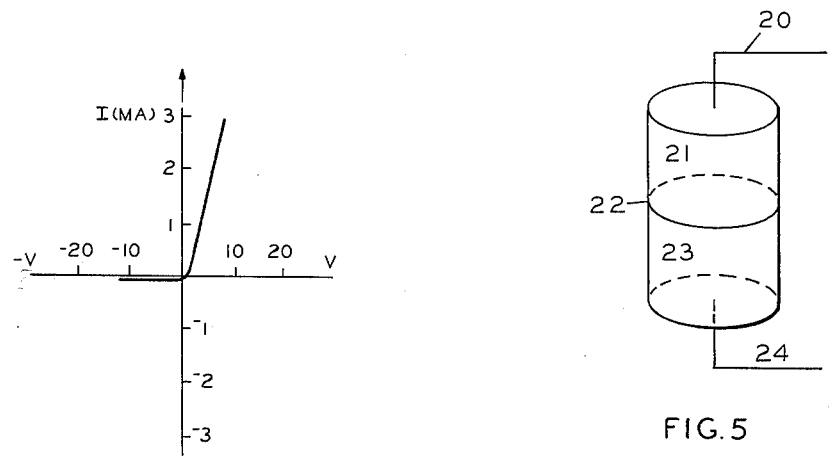
FIG. 4 is a graph showing a trace of the dynamic rectification properties at a frequency of 60 cycles/sec.

FIG. 3 shows a plot of the D.C. current-voltage characteristics in the forward and reverse directions, and FIG. 4 shows a plot of the dynamic rectification properties at a frequency of 60 cycles/sec.

Multiple units of the present point contact rectifier may also be provided such as by making alternate connections between the base 13 and the corresponding lead 15 of the next unit.

In the formation of multiple units, it is an advantage of the present epitaxial gallium phosphide that deposition of lightly-doped regions on the surface or within the structure can readily be attained. A number of alternating high resistivity n and p layers, each relatively thin, may be deposited at the external surface of the device (the product in conventional electronics terminology) to provide an isolation region between deposited layers. This has the advantage of reducing capacitive coupling between separate portions of the structure and also provides a high resistivity path since many back biased diodes must be traversed to go from one region to another within a structure.

EXAMPLE 8

The gallium phosphide as an epitaxial layer is doped to form a p-n junction. A practical embodiment of such doped epitaxial gallium phosphide is as a tunnel diode.

Doping is easily controlled in the present gallium phosphide device, and unusually high orders of doping are easily possible, in the manufacture of tunnel diodes which require as much as 0.1% by weight of doping. The carrier concentrations are of the order of $5 \times 10^{19}$ to $2 \times 10^{20}$. The dopant is vaporized together with the gallium phosphide-hydrogen halide reaction product to obtain unusually homogeneous distribution of the dopant in the epitaxial film. For example, p-type dopants such as zinc and cadmium as well as n-type dopants such as sulfur, selenium, or tellurium are vaporized in the appropriate concentration relative to the gallium phosphide.

The distinguishing feature of the tunnel diode is the high concentration of the dopant present at a $8 \times 10^{19}$ carriers/cc. concentration in the first layer. This first layer is produced by depositing the p-type gallium phosphide upon a previously prepared substrate of the same p-type gallium phosphide so that a homogeneous layer is obtained.

In a separate operation, the said zinc doped gallium phosphide is built up by additional vapor deposition of gallium phosphide containing sulfur as the n-type dopant with $1 \times 10^{20}$ carriers/cc. concentration.

It has also been found that the sulfur doped layer may be formed first and the zinc doped gallium phosphide deposited thereon.

Another method is the use of a conventional doped p or n doped gallium phosphide first layer, which is then built up by vapor phase deposition with oppositely doped epitaxial gallium phosphide.

Figure 5:
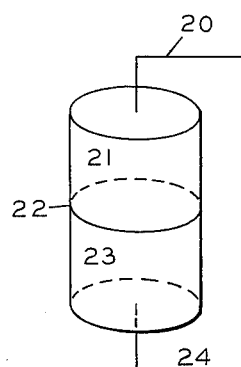
FIG. 5 shows a tunnel diode having the epitaxial layer and substrate as the semiconductor component with the p–n junction between the layers.

In FIG. 5, element 20 represents a lead of a conventional metal such as copper, which makes an ohmic contact with the present device. Element 21 of the present device represents zinc doped epitaxial gallium phosphide. The single crystal gallium phosphide which is n-type as discussed above is formed by vapor phase deposition with the zinc dopant. The gallium phosphide so prepared is a thin layer, of about $10^{-6}$ cm. but in general is readily obtained at $10^{-5}$ cm. to 0.05 or preferably $5—10^{-7}$ to 0.1 cm. thickness. These can be far thinner, e.g., to $\frac{1}{10}$ as thin as can be obtained by mechanical sawing, using conventional means. The first epitaxial layer 21 is in contact with another vapor deposited layer 23 formed in the same way, but with an opposite type dopant, e.g., sulfur. The junction between the two layers is shown as 22. Element 23 has a lead 24 of a conventional metal such as copper or a similar material. These lead elements 20 and 24 desirably have good thermal conductivity. In order to provide good electrical contact between the semiconductor and the lead metal, silver, for example, may be employed as the soldering material to provide an ohmic contact of low resistance. The present tunnel diode can exist in a variety of forms convenient to the device user. Thus, the example shown here is made as a cylinder of about .1 mm. diameter and .11 mm. thickness. This small size is a great advantage since it makes possible a switching time of $\sim 10^{-12}$ sec. Sizes up to 1 mm. are also readily attained.

Multiple units of the present point contact rectifier may also be provided such as by making alternate connections between the base and the corresponding lead of the next unit.

In the formation of multiple units, it is an advantage of the present epitaxial gallium phosphide that deposition of lightly-doped regions on the surface or within the structure can readily be attained. A number of alternating high resistivity n and p layers, each relatively thin may be deposited at the external surface of the device (the product in conventional electronics terminology) to provide an isolation region between deposited layers. This has the advantage of reducing capacitive coupling between separate portions of the structure and also provides a high resistivity path since many back biased diodes must be traversed to go from one region to another within a structure.

EXAMPLE 9

Figure 6:
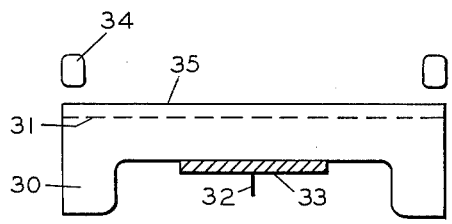
FIG. 6 shows a photocell having the epitaxial film on the substrate and the p–n junction.

As an example of the medium doped epitaxial gallium phosphide, the present example shows a photovoltaic cell. This device, which is schematically shown in FIG. 6 is composed of a major body 30 of n-type gallium phosphide which has a thin layer 35 of p-type gallium phosphide deposited upon the n-type portion as described above. In order to make electrical contact with the n-type material, a lead 32 is attached to 30 by means of a soldered joint, such as silver solder or silver paint 33 joining lead 32 to body 30.

In the present device the only p–n junction 31 should be just below the light receptive surface. All other surfaces should be protected during deposition, provided with a counter layer, or be lapped, cut or etched to eliminate the epitaxial layer from all but the light receptive surface. A contact is then made with the n-type body. The second electrical contact in addition to element 32 is made directly with the p surface by a ring 34 at the top or side of the disc to provide contact with the external measuring circuit.

In the operation of the photovoltaic cell which is also suitable for use as a solar cell, light is directed towards the free face corresponding of the p-type gallium phosphide as an epitaxial layer with the result that an electric signal is obtained from leads 32 and 34.

It is desirable that the epitaxial layer 31 be as thin as possible, for example $10^{-5}$ cm. in order to permit weak light beams to be detected, or in general, less than $4 \times 10^{-4}$ cm.

In a modification especially suitable for a solar cell the parent layer, element 30, is n-type (sulfur doped) gallium phosphide deposited epitaxially as described in Example 8, and containing $1 \times 10^{17}$ carriers/cc. The p-n junction is formed using vapor deposition of p-type gallium phosphide (zinc doped, about $10^{18}$ carriers/cc.) and with this external layer 35 being about $2 \times 10^{-4}$ cm. in depth. In general for a solar cell, this layer is made $1 \times 10^{-4}$ to $2 \times 10^{-4}$ cm. In the present device the surface area of the cell is 0.001 cm.$^2$, but the method is applicable equally well to large areas. In devices of the type described in this example conversion efficiencies of about 5% are obtained which compares favorably with efficiencies of about 2% for cadmium telluride.

The present photovoltaic cells prepared by vapor deposition of an epitaxial layer are easily made as a part of other apparatus, which cannot be made by conventionl diffusion or alloying. For example, a transistor in a micromodule is powered from the output of the photovoltaic (e.g., solar type) cell, making an external power source unnecessary, so that the combination unit can be isolated particularly to avoid short circuiting p and n layers in a transistor.

In using the epitaxial gallium phosphide as a light and radiant energy detection and measurement material, it is a particular advantage of this material that it has an unusually high energy gap, e.g., 2.3 ev. so that intense energy radiation, such as β-radiation encountered in space can readily be detected.

EXAMPLE 10

The present example illustrates the manufacture of rectifiers, using gallium phosphide as an epitaxial layer doped to form an n-type substrate with sulfur as the dopant ($1 \times 15^{15}$ carriers/cc.).

The base layer is then coated with a layer of epitaxial gallium phosphide of p-type (Zn dopant) with a greater concentration than $1 \times 10^{15}$. The thickness is 0.001 cm. for the p layer, the total thickness being 0.01 cm.

Doping is easily controlled in the present gallium phosphide device. The carrier concentrations in general are of the order of $1 \times 10^{13}$ to $1 \times 10^{17}$. The dopant is vaporized together with the gallium phosphide-hydrogen halide reaction product to obtain unusually homogeneous distribution of the dopant in the epitaxial film. For example, p-type dopants such as zinc and cadmium as well as n-type dopants such as sulfur, selenium, are vaporized in the appropriate concentration relative to the gallium phosphide.

It has also been found that the sulfur doped layer may be formed first and the zinc doped gallium phosphide deposited thereon.

Another method is the use of a conventional p or n doped gallium phosphide first layer, which is then built up by vapor phase deposition with oppositely doped epitaxial gallium phosphide.

Figure 7:
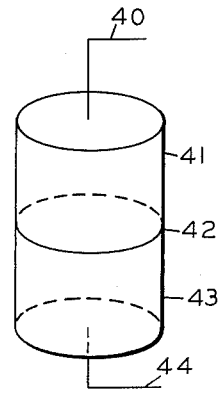
FIG. 7 shows a rectifier similar to the tunnel diode of FIG. 5.

In FIG. 7, which is applicable to rectifiers, element 40 represents a lead of a conventional metal such as copper, which makes an ohmic contact with the present device. Element 41 of the present device represents zinc doped epitaxial gallium phosphide. The single crystal gallium phosphide which is n-type as discussed above is formed by vapor phase deposition with the zinc dopant. The gallium phosphide so prepared is a thin layer, the overall diameter being about 0.30 cm. The junction between the the two layers is shown as element 42. Element 43 has a lead 44 of a conventional metal such as copper or a similar material. These lead elements 40 and 44 desirably have good thermal conductivity. In order to provide good electrical contact between the semiconductor and the lead metal, silver, for example, may be employed as the soldering material to provide an ohmic contact of low resistance. The present rectifiers can exist in a variety of forms convenient to the device user. Thus, the example shown here is made as a cylinder.

The electrical characteristics of the rectifier are controlled by (1) the resistivity of the base material, (2) the sharpness of the junction with respect to the diffusion of the p and n type dopants into the other zone, and (3) the width of the base layer of n type layer.

Figure 9:
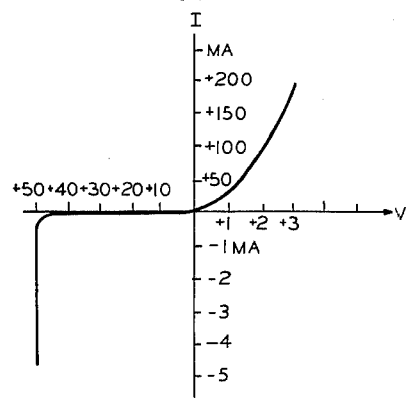
FIG. 9 is a graph showing a typical D.C. current-voltage plot of a diode having the epitaxial film and substrate structure and exhibiting Zener characteristics.

It was found that for a layer of n-type material as described above and a very sharp junction of discontinuity a sharp reverse breakdown at 50 volts was obtained with a current of 5 ma. as shown in FIGS. 9. This is what is known as a Zener diode.

Figure 8:
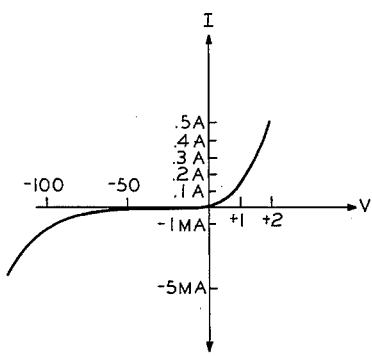
FIG. 8 is a graph showing a plot of the D.C. current-voltage characteristics of a graded p–n junction rectifier having the structural characteristics defined herein.

When a graded or more diffuse junction is used, the v.–I characteristics are likewise more gradual as shown in FIG. 8. Here a reverse voltage of 100 v. is obtained with a leakage current of 1 ma. In the forward direction a voltage drop of 2 v. is obtained with ½ amp.

While the present description has, for the sake of simplicity been based primarily upon gallium arsenide to show the preparative steps, and upon gallium phosphide to show specific devices, it is understood that the invention is likewise applicable to the other compositions defined above, and that the invention is subject to reasonable modifications and variations without departing from the spirit and scope thereof.

We claim:

1. Process for the production of a single crystal form of a compound selected from the group consisting of binary compounds and mixtures thereof comprising elements selected from the group consisting of aluminum, gallium and indium together with elements selected from the group consisting of nitrogen, phosphorus, arsenic and antimony, which comprises contacting a crude source of said compound with a hydrogen halide vapor at a first temperature sufficient to react said compound with said hydrogen halide, and subjecting the resulting gaseous reaction mixture to a region of a second and lower temperature sufficient to deposit a single crystal form of said compound from said reaction mixture.

2. Process for the production of a single crystal form of a compound selected from the group consisting of binary compounds and mixtures thereof comprising elements selected from the group consisting of aluminum, gallium and indium together with elements selected from the group consisting of nitrogen, phosphorus, arsenic and antimony, which comprises contacting a crude source of said compound with a hydrogen halide vapor at a first temperature within the range of from 135° C. to 1200° C., and subjecting the resulting gaseous reaction mixture to a region of a second and lower temperature within the range of from 130° C. to 1195° C., there being a temperature differential between the higher and lower temperature regions of from 5° C. to 1070° C., whereby a single crystal form of said compound is precipitated from the said gaseous reaction mixture.

3. Process for the production of a single crystal form of gallium arsenide which comprises contacting a crude source of said gallium arsenide with a hydrogen halide vapor at a first temperature within the range of from 700° C. to 1200° C., and subjecting the resulting gaseous reaction mixture to a region of a second and lower temperature within the range of from 500° C. to 1195° C., there being a temperature differential between the higher and lower temperature regions of from 5° C. to 700° C., whereby a single crystal form of gallium arsenide is precipitated from the gaseous reaction mixture.

4. Process according to claim 3 wherein the higher temperature is 900° C., the lower temperature is 550° C.

5. Process for the production of a single crystal form of a mixture of binary compounds comprising elements selected from the group consisting of aluminum, gallium and indium together with elements selected from the group consisting of nitrogen, phosphorus, arsenic and antimony which comprises contacting a crude source of said mixture with a hydrogen halide vapor at a first temperature within the range of from 135° C. to 1200° C. and subjecting the resulting gaseous reaction mixture to a region of a second and lower temperature within the range of from 130° C. to 1195° C., there being a temperature differential between the higher and lower regions of from 5° C. to 1070° C., whereby a single crystal form of the said mixture is precipitated from the said gaseous reaction mixture.

6. Process for the production of a single crystal form of a mixture of gallium arsenide-gallium phosphide which comprises contacting a source of said mixture in polycrystalline form with a hydrogen halide vapor at a first temperature within the range of from 700° C. to 1200° C. and subjecting the resulting gaseous reaction mixture to a region of a second and lower temperature within the range of from 500° C. to 1195° C., there being a temperature differential between the higher and lower regions of from 5° C. to 700° C., whereby a single crystal form of mixed gallium arsenide-gallium phosphide is precipitated from said reaction mixture.

7. Process for the production and deposition of an epitaxial film of compounds selected from the group consisting of binary compounds and mixtures thereof formed from elements selected from the group consisting of aluminum, gallium and indium together with elements selected from the group consisting of nitrogen, phosphorus, arsenic and antimony, onto a substrate material selected from the same class of compounds comprising the epitaxial film, which comprises contacting a crude source of said compounds with a hydrogen halide vapor at a first temperature within the range of from 135° C. to 1200° C., and subjecting the resulting gaseous reaction mixture to a region of a second and lower temperature within the range of from 130° C. to 1195° C., there being a temperature differential between the higher and lower temperature regions of from 5° C. to 1070° C., whereby a purified single crystal form of said compound is precipitated from said gaseous reaction mixture and deposited as an epitaxial film upon said substrate.

8. Process for the production and deposition of an epitaxial film of compounds selected from the group consisting of binary compounds and mixtures thereof formed from elements selected from the group consisting of aluminum, gallium, and indium together with elements selected from the group consisting of nitrogen, phosphorus, arsenic and antimony onto a substrate material selected from the same group of compounds comprising said epitaxial film, which comprises contacting a crude source of said compounds with a hydrogen halide vapor at a first temperature sufficient to react said compound with said hydrogen halide, and subjecting the resulting gaseous reaction mixture to a region of a second and lower temperature sufficient to deposit a single crystal form of said compound from said reaction mixture as an epitaxial film onto said substrate material.

9. Process according to claim 8 wherein said epitaxial film is gallium arsenide and said substrate is also gallium arsenide.

10. Process according to claim 8 wherein said epitaxial film is gallium phosphide and said substrate is also gallium phosphide.

11. Process according to claim 8 wherein said epitaxial film is indium arsenide and said substrate is also indium arsenide.

12. Process according to claim 8 wherein said epitaxial film is indium phosphide and said substrate is gallium phosphide.

13. Process according to claim 8 wherein said epitaxial film is gallium arsenide and said substrate is gallium phosphide.

14. Process for the production and deposition of an epitaxial film of compounds selected from the group consisting of binary compounds and mixtures thereof having p-type conductivity onto a substrate material having n-type conductivity, said epitaxial film and substrate material being compounds comprised of elements selected from the group consisting of aluminum, gallium and indium together with elements selected from the group consisting of nitrogen, phosphorus, arsenic and antimony, which comprises contacting a crude source of said compounds containing therein a small amount of a doping element selected from Group II of the periodic system with a hydrogen halide vapor at a first temperature within the range of from 135° C. to 1200° C., and subjecting the resulting gaseous reaction mixture to a region of a second and lower temperature within the range of from 130° C. to 1195° C., there being a temperature differential of from 5° C. to 1070°C. between the higher and lower temperature regions, whereby a single crystal form of said compound containing said Group II element is precipitated from said gaseous reaction mixture forming an epitaxial film on said substrate material of n-type conductivity by incorporation therein of a small amount of a doping element selected from Group VI of the periodic system.

15. Process for the production and deposition of an epitaxial film of gallium arsenide having p-type conductivity onto a substrate of gallium arsenide having n-type conductivity, which comprises contacting a source of gallium arsenide containing a small amount of a doping element selected from Group II of the periodic system with hydrogen halide vapor at a temperature of 900° C., subjecting the resulting gaseous reaction product to a region of lower temperature at 550° C., whereby a single crystal form of gallium arsenide containing said doping element is precipitated from said gaseous reaction mixture onto said substrate of n-type gallium arsenide containing a small amount of a doping element selected from Group VI of the periodic system.

16. Process for the production and deposition of an epitaxial film of compounds selected from the group consisting of binary compounds and mixtures thereof having n-type conductivity onto a substrate material having p-type conductivity, said epitaxial film and substrate material being compounds comprised of elements selected from the group consisting of aluminum, gallium and indium together with elements selected from the group consisting of nitrogen, phosphorus, arsenic and antimony which comprises contacting a crude source of said compounds containing therein a small amount of a doping element selected from Group VI of the periodic system with a hydrogen halide vapor at a first temperature within the range of from 135° C. to 1200° C., and subjecting the resulting gaseous reaction mixture to a region of a second and lower temperature within the range of from 130° C. to 1195° C., there being a temperature differential between the higher and lower temperature regions of from 5° C. to 1070° C., whereby a single crystal form of said compound containing said Group VI element is precipitated from said gaseous reaction mixture forming an epitaxial film on said substrate material of p-type conductivity by incorporation therein of a small amount of a doping element selected from Group II of the periodic system.

17. Process for the production and deposition of an epitaxial film of gallium arsenide having n-type conductivity onto a substrate of gallium arsenide having p-type conductivity, which comprises contacting a source of gallium arsenide containing a small amount of a doping element selected from Group VI of the periodic system with hydrogen chloride vapor at a temperature of 900° C., subjecting the resulting gaseous reaction product to a region of lower temperature at 500° C., whereby a single crystal form of gallium arsenide containing said doping element is precipitated from said gaseous reaction mixture onto said substrate of p-type gallium arsenide containing a small amount of a doping element selected from Group II of the periodic system.

References Cited by the Examiner

UNITED STATES PATENTS

| | | | |
|---|---|---|---|
| 2,692,832 | 10/1954 | Christensen et al. | 148—175 |
| 2,798,989 | 7/1957 | Welker | 148—1.5 |
| 2,830,239 | 4/1958 | Jenny | 317—237 |
| 2,929,859 | 3/1960 | Loferski | 148—1.5 |
| 3,000,768 | 9/1961 | Marinace | 148—1.5 |
| 3,012,175 | 12/1961 | Jones | 317—237 |
| 3,014,820 | 12/1961 | Marinace et al. | 148—1.5 |
| 3,057,762 | 10/1962 | Gans | 317—235 |
| 3,094,388 | 6/1963 | Johnson et al. | 23—204 |

FOREIGN PATENTS

| | | |
|---|---|---|
| 1,193,194 | 10/1959 | France. |
| 1,029,941 | 5/1958 | Germany. |

OTHER REFERENCES

Anderson: "Ge–GaAs Heterojunctions," IBM Journal of Research and Development, vol. 4, No. 3, July 1960, pp. 283–287.

Antell et al.: "Preparation of Crystals of InAs, InP, GaAs, and GaP by Vapor Phase Reaction," Journal of the Electrochemical Society, vol. 106, June 1959, pp. 509–510.

Glang et al.: Article in Metallurgy of Semiconductor Materials, Interscience Publishers, vol. 15, pp. 27–47. In particular pp. 29 and 30.

Holonyak et al.: Article in Metallurgy of Semiconductor Materials, Interscience Publishers, vol. 15, pp. 49–59.

Marinace: "Vapor Growth of InSb Crystals by an Iodine Reaction," IBM Technical Disclosure Bulletin, vol. 3, No. 8, Jan. 1961, pg. 33.

HYLAND BIZOT, *Primary Examiner.*

BENNETT G. MILLER, DAVID L. RECK, *Examiners.*